United States Patent
Glugla et al.

(10) Patent No.: US 9,890,758 B2
(45) Date of Patent: Feb. 13, 2018

(54) SYSTEM AND METHOD FOR DIAGNOSING AN IGNITION SYSTEM

(71) Applicant: Ford Global Technologies, LLC, Dearborn, MI (US)

(72) Inventors: Chris Paul Glugla, Macomb, MI (US); Michael Damian Czekala, Canton, MI (US); Garlan J. Huberts, Milford, MI (US); Qiuping Qu, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/173,374

(22) Filed: Jun. 3, 2016

(65) Prior Publication Data

US 2017/0350362 A1     Dec. 7, 2017

(51) Int. Cl.
| | | |
|---|---|---|
| F02P 3/045 | (2006.01) | |
| F02D 41/00 | (2006.01) | |
| F02D 35/02 | (2006.01) | |
| F02P 17/12 | (2006.01) | |

(52) U.S. Cl.
CPC ............ *F02P 3/045* (2013.01); *F02D 35/023* (2013.01); *F02D 41/005* (2013.01); *F02D 41/0097* (2013.01); *F02P 17/12* (2013.01); F02D 2200/1015 (2013.01)

(58) Field of Classification Search
CPC ....... F02P 3/045; F02P 17/12; F02D 41/0097; F02D 41/005; F02D 35/023; F02D 2200/1015
See application file for complete search history.

(56) References Cited

U.S. PATENT DOCUMENTS

| | | | | | |
|---|---|---|---|---|---|
| 3,572,302 | A | * | 3/1971 | Wollesen | F02P 9/005 123/335 |
| 4,112,890 | A | * | 9/1978 | Manger | F02P 15/10 123/406.59 |
| 4,625,546 | A | * | 12/1986 | Sugo | G01M 15/044 73/114.08 |
| 4,930,481 | A | * | 6/1990 | Fujimoto | F02D 41/22 123/198 DB |
| 5,221,904 | A | * | 6/1993 | Shimasaki | F02P 17/12 123/479 |
| 5,327,090 | A | * | 7/1994 | Shimasaki | F02P 17/12 123/644 |
| 5,349,299 | A | * | 9/1994 | Kanehiro | F02P 17/12 123/479 |
| 5,563,515 | A | * | 10/1996 | Kako | F02B 77/08 324/391 |

(Continued)

OTHER PUBLICATIONS

Huberts, Garlan J. et al., "System and Method for Operating an Ignition System," U.S. Appl. No. 14/808,819, filed Jul. 24, 2015, 45 pages.

*Primary Examiner* — Joseph Dallo
(74) *Attorney, Agent, or Firm* — Julia Voutyras; McCoy Russell LLP (57) ABSTRACT

A system and method for assessing the presence or absence of ignition coil degradation for an ignition system that includes two ignition coils for each spark plug. Ignition coil degradation may be determined without having to monitor ignition coils via specialized hardware circuitry. In one example, degradation of one or more ignition coils may be inferred from cylinder the presence or absence of cylinder misfire.

16 Claims, 4 Drawing Sheets

(56) References Cited

U.S. PATENT DOCUMENTS

| | | | | |
|---|---|---|---|---|
| 5,862,505 A * | 1/1999 | Fujiki | ............. | F02B 77/085 |
| | | | | 123/436 |
| 6,550,456 B1 * | 4/2003 | Uchida | ............. | F02D 35/021 |
| | | | | 123/406.14 |
| 6,600,322 B1 * | 7/2003 | Nussbaum | ............. | F02P 3/06 |
| | | | | 123/406.3 |
| 2003/0164025 A1 * | 9/2003 | Kiess | ............. | F02P 17/12 |
| | | | | 73/35.08 |
| 2006/0030993 A1 * | 2/2006 | Goodell | ............. | F02P 17/12 |
| | | | | 701/114 |
| 2009/0071441 A1 * | 3/2009 | Kiessling | ............. | F02P 9/005 |
| | | | | 123/406.53 |
| 2009/0126710 A1 * | 5/2009 | Alger, II | ............. | F02P 15/08 |
| | | | | 123/636 |
| 2009/0260607 A1 * | 10/2009 | LaDuke | ............. | F02P 9/002 |
| | | | | 123/609 |
| 2010/0288035 A1 * | 11/2010 | Arakawa | ............. | G01M 15/11 |
| | | | | 73/114.03 |
| 2011/0041803 A1 | 2/2011 | Qu et al. | | |
| 2011/0247598 A1 * | 10/2011 | Tanaya | ............. | F02P 17/12 |
| | | | | 123/594 |
| 2014/0000555 A1 * | 1/2014 | Glugla | ............. | F02D 41/008 |
| | | | | 123/305 |
| 2014/0102412 A1 * | 4/2014 | Czekala | ............. | F02P 3/04 |
| | | | | 123/406.12 |
| 2015/0136080 A1 * | 5/2015 | Surnilla | ............. | F02D 41/1448 |
| | | | | 123/347 |
| 2015/0152832 A1 | 6/2015 | Desai et al. | | |
| 2015/0361946 A1 * | 12/2015 | Pham | ............. | F02P 17/12 |
| | | | | 324/388 |

* cited by examiner

FIG. 4

SYSTEM AND METHOD FOR DIAGNOSING AN IGNITION SYSTEM

FIELD

The present description relates to a system and method for delivering spark to a spark ignited engine. The system and method may be particularly useful for ignition systems that provide spark to a single spark plug via two ignition coils.

BACKGROUND AND SUMMARY

An engine may be operated with a high concentration of exhaust gas recirculation (EGR) to reduce engine emissions and engine pumping losses. However, it may be more difficult to ignite highly diluted air-fuel mixtures. One way to increase the probability of igniting a dilute mixture is to increase an amount of energy delivered to a spark plug. The amount of energy supplied to a spark plug may be increased via increasing the inductance of a coil supplying energy to the spark plug. Nevertheless, it may still be difficult to ignite a diluted air-fuel mixture if the spark energy is delivered over a short time period. On the other hand, two ignition coils may be configured to supply spark energy to a spark plug, thereby increasing the energy delivered to the spark plug and spark duration so that the possibility of igniting a dilute air-fuel mixture may be increased. Although two ignition coils may increase the possibility of igniting the air-fuel mixture, cost of diagnosing degradation of two ignition coils via hardware signals and amplifiers may be prohibitive. Therefore, it may be desirable to provide a way of diagnosing two ignition coils that supply energy to a sole spark plug without having to significantly increase diagnostic hardware.

The inventors herein have recognized the above-mentioned disadvantages and have developed a method for operating an ignition system, comprising: receiving engine data to a controller; judging a presence or absence of misfire in a cylinder during a cycle of the cylinder based on the engine data via the controller; and indicating ignition coil degradation and combusting air and fuel in the cylinder via the controller in response to absence of misfire in the engine cylinder during the cycle of the cylinder.

By realizing that a cylinder may combust air and fuel even when one of two ignition coils are degraded, it may be possible to diagnose ignition coil degradation without added sensors or hardware. For example, after a first indication of a misfire episode in a cylinder, ignition coil dwell may be increased to reduce a possibility of misfire in a cylinder if the cylinder's ignition coils are not degraded. Sufficient spark energy may be present in the cylinder to ignite an air-fuel mixture, even when high EGR levels are in the cylinder, when spark energy is increased via increasing dwell time of two ignition coils. In this way, increasing the dwell time of two ignition coils may provide insight as to whether or not ignition coils are degraded. If dwell time of the two ignition coils is increased and misfire is still present in the cylinder, EGR delivered to the cylinder may be decreased to ascertain if the cylinder will fire (e.g., combust air and fuel) with a lower EGR amount. If the cylinder fires, it indicates that one ignition coil is operable, but the second ignition coil is degraded. If the cylinder does not fire, it indicates that both ignition coils and/or their circuitry are degraded.

The present description may provide several advantages. For example, the approach provides for diagnosing operation of two ignition coils without additional hardware. Further, the approach does not require individually commanding ignition coils to determine if a single ignition coil is degraded. Additionally, it may be possible to diagnose a degraded ignition coil in a shorter amount of time and/or in a fewer actual total number of cylinder cycles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
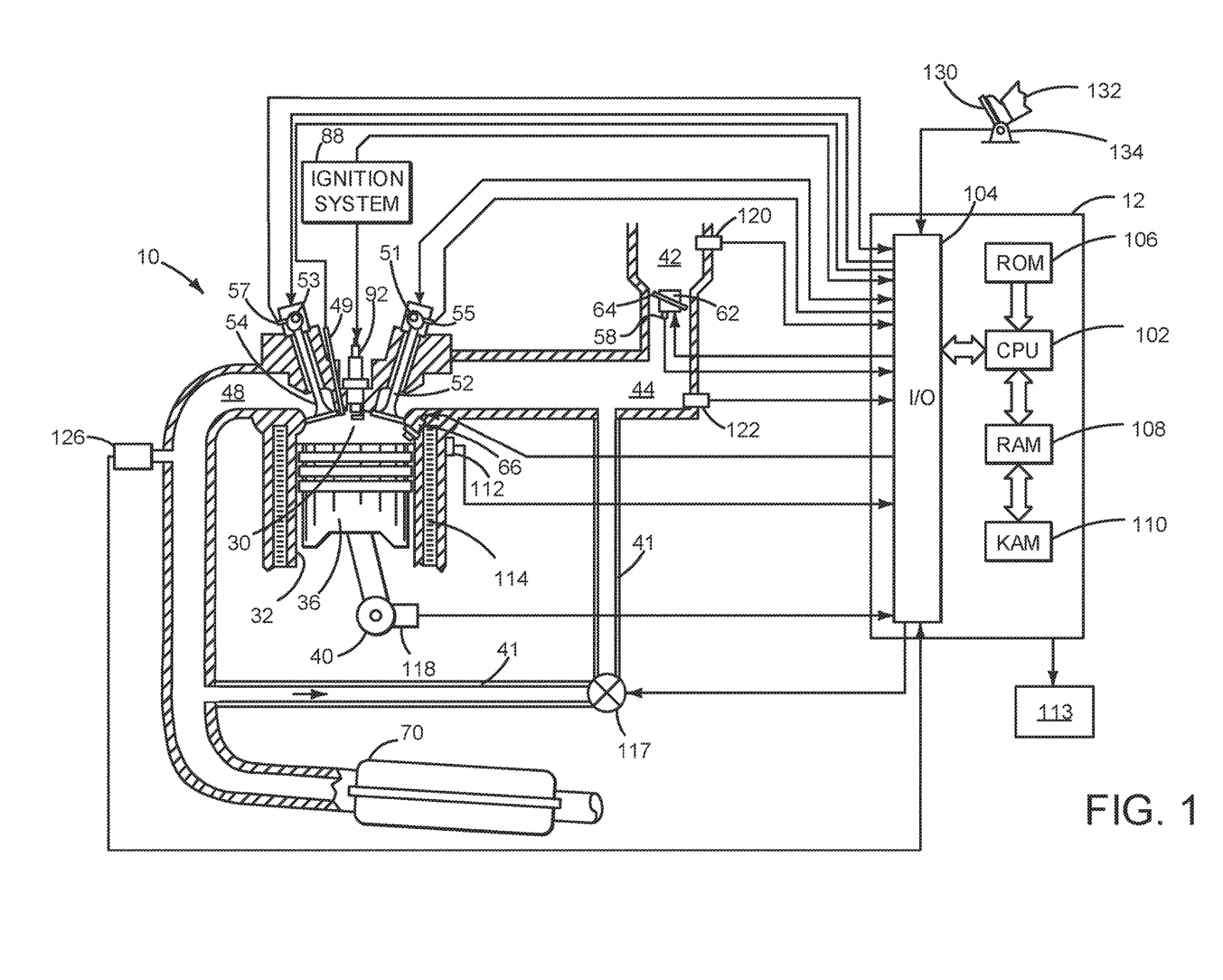
FIG. 1 is a schematic diagram of an engine.
Figure 2:
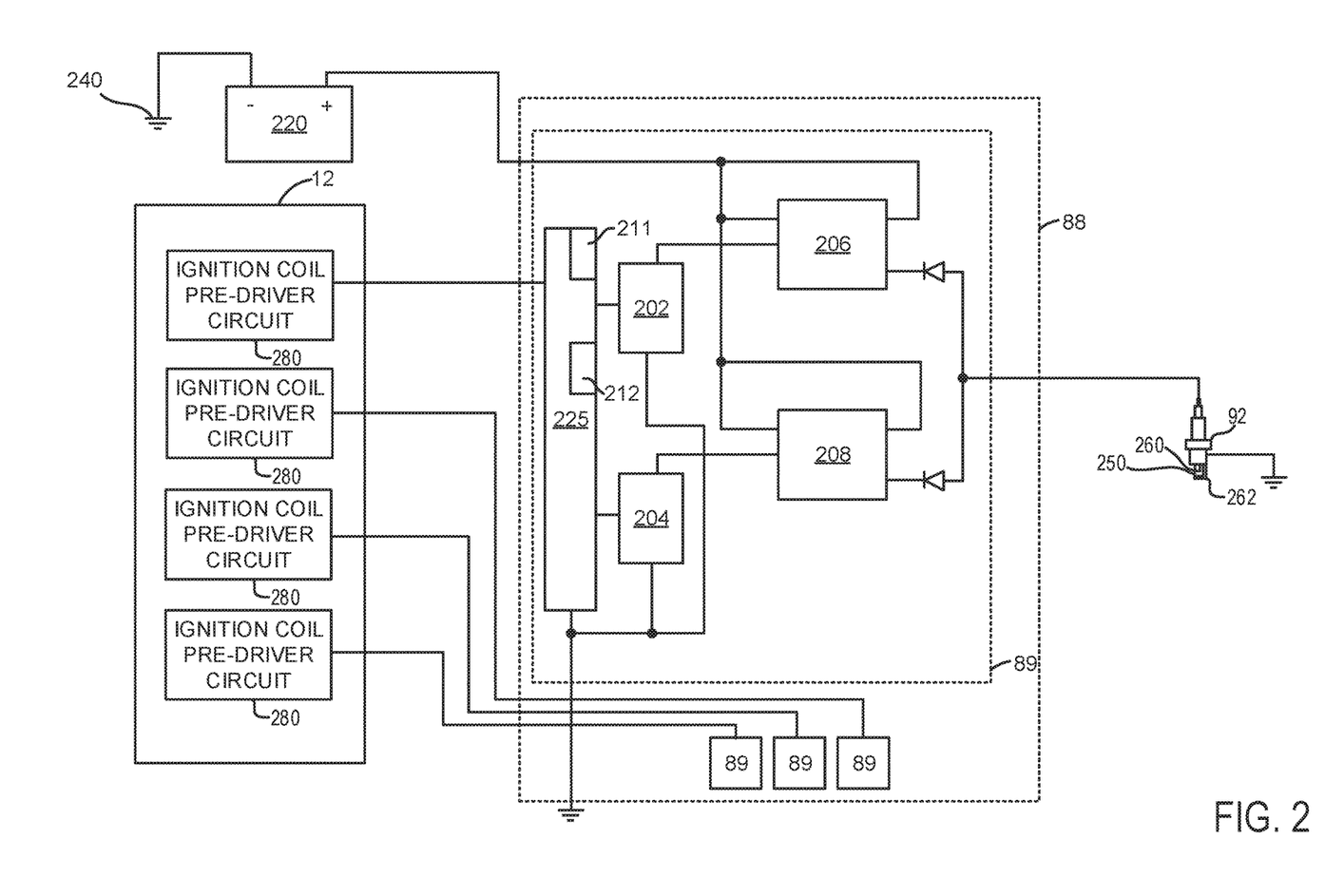
FIG. 2 is a schematic diagram of an ignition system.
Figure 3:
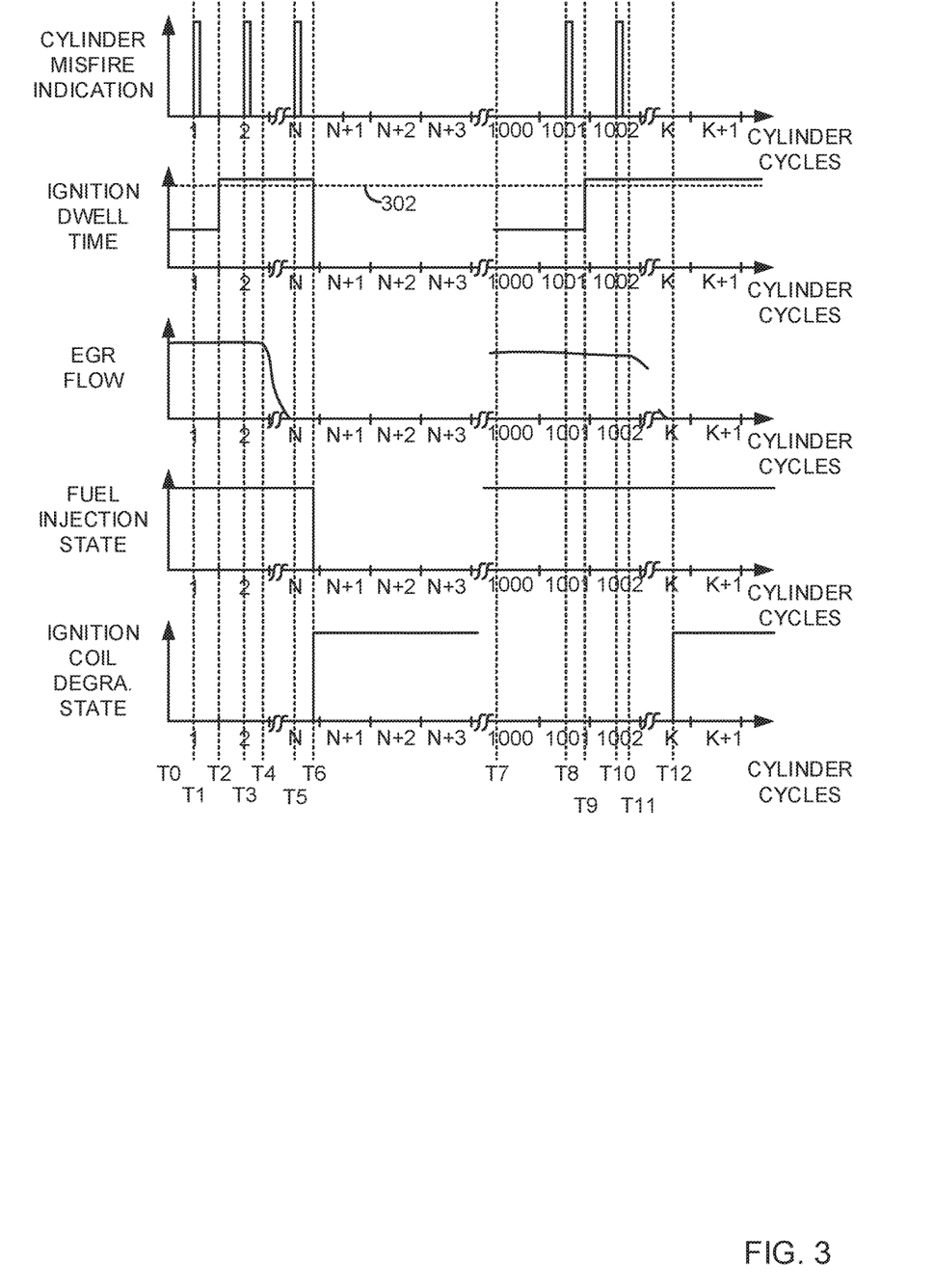
FIG. 3 show plots of example ignition coil diagnostic sequences.
Figure 4:
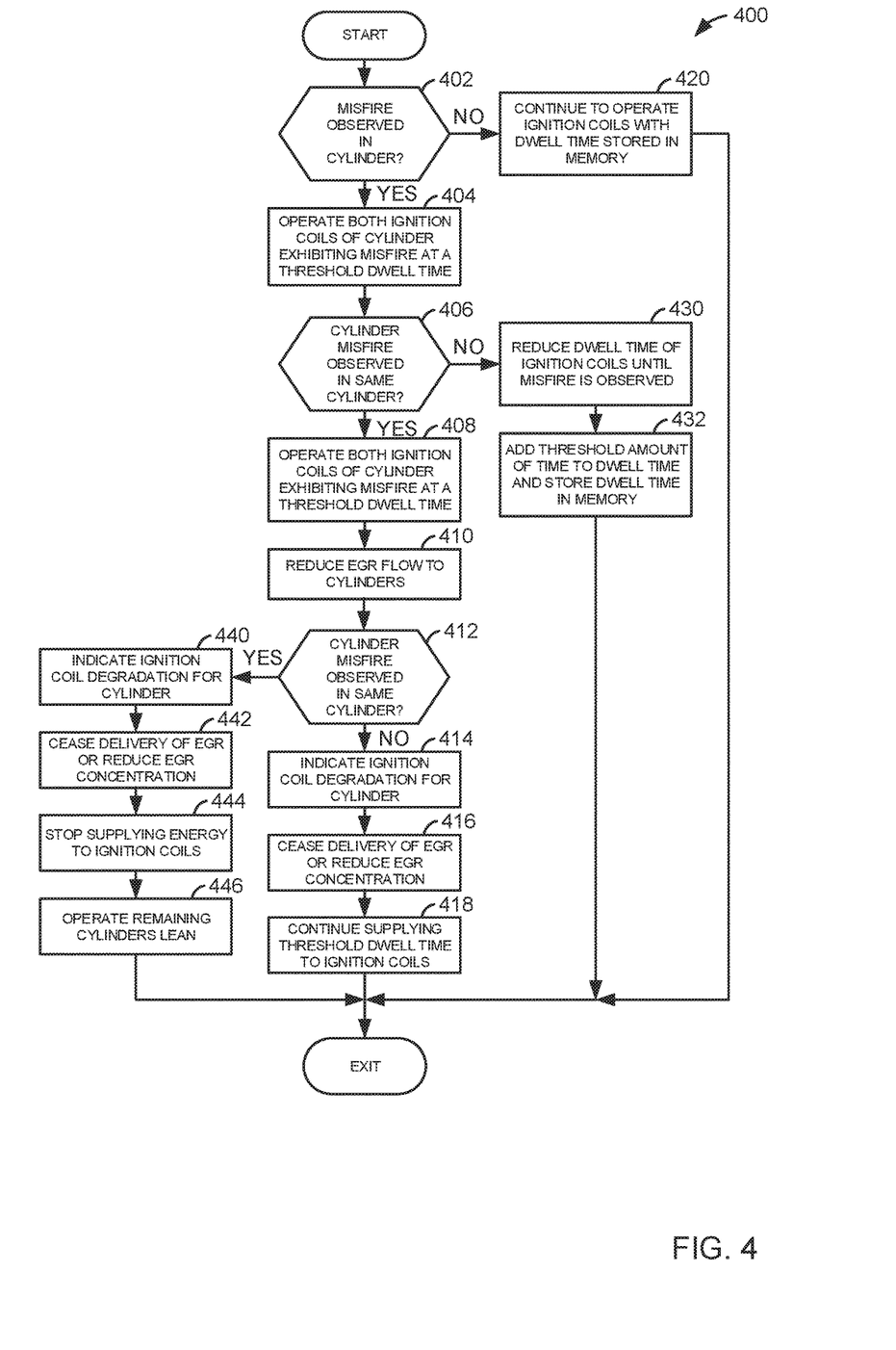
FIG. 4 shows a method for assessing ignition coil degradation.

The present description is related to diagnosing the presence or absence of ignition coil degradation in an ignition system that provides spark energy to a single spark plug via two ignition coils. The two ignition coils may increase spark energy and spark duration via discharging in a sequence to a single or sole spark plug of a cylinder during a cycle of the cylinder. FIG. 1 shows an example engine and ignition system. FIG. 2 shows a detailed view of the ignition system shown in FIG. 1. Example ignition coil diagnostic sequences are shown in FIG. 3. A method for diagnosing ignition coils is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of adjustable intake cam 51 may be determined by intake cam sensor 55. The position of adjustable exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of a signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44.

Exhaust gas may be recirculated from exhaust manifold 48 to intake manifold 44 via exhaust passage 41. EGR valve 117 is located along the length of exhaust passage 41 to control the exhaust flow rate from exhaust manifold 48 to intake manifold 44. A position of EGR valve 117 is controlled via controller 12. The direction of exhaust flow is indicated by the arrow.

Distributorless ignition system 88 provides an ignition spark to combustion chamber 30 via spark plug 92 in response to commands from controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a pressure in combustion chamber 30 via pressure sensor 49; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In one aspect of the present description, engine position sensor 118 produces a predetermined number of equally spaced pulses every revolution of the crankshaft from which engine speed (RPM) can be determined.

Controller 12 may also provide diagnostic and vehicle information to vehicle occupants via display 113. Display 113 may be a graphics terminal, light, or other human/machine interface.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example the engine may be turbocharged or supercharged.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a schematic of an example ignition system. In this example, controller 12 includes an ignition coil pre-driver circuits 280, one for each ignition coil module 89 that may be operated to supply electrical energy to a spark plug of a single cylinder. The ignition coil pre-driver circuit 280 supplies a control signal comprising voltage pulses to interpretive logic 225. Where the engine includes N cylinders, N ignition coil pre-driver circuits provide control signals for ignition modules 89. In this example, four ignition coil modules 89 are supplied control signals via four ignition coil pre-driver circuits 280. One ignition coil module 89 is shown in detail. Interpretive logic 225 may be included in a programmable hardware logic array 211 or as part of executable instructions stored in non-transitory memory of a central processing unit 212. Interpretive logic 225 monitors the timing and level of a signal provided by pre-driver circuit 280.

For example, interpretive logic 225 changes a state of a signal supplied to ignition coil driver 202 in response to a voltage pulse of a second ignition coil command of the ignition command signal. Interpretive logic changes a state of a signal supplied to ignition coil driver 204 in response to voltage pulses of a first ignition coil command of the ignition command signal. Interpretive logic 225 may output individual signals to ignition coil drivers 202 and 204. The signals supplied to ignition coil drivers 202 and 204 by interpretive logic 225 are synchronous with cylinder strokes of the cylinder being supplied spark via first ignition coil 206 and second ignition coil 208. In one example, at least one spark is provided during each cycle of the cylinder receiving spark from first ignition coil 206 and/or second ignition coil 208. For example, a spark may be supplied once a cylinder cycle during a compression stoke of the cylinder receiving spark. Further, in one example, first ignition coil 206 has a different inductance than second ignition coil 208.

Ignition coil drivers 202 and 204 are included in ignition system ignition coil module 89 which may be positioned on top of or near spark plug 92. Alternatively, drivers 202 and 204 may be included in controller 12. Electric energy storage device 220 sources electrical current to first ignition coil 206. Second ignition coil 208 is selectively supplied current via second coil driver 204. Electric energy storage device 220 sources electrical current to second ignition coil 208.

Spark plug 92 may be supplied electrical energy from first ignition coil 206 and/or second ignition coil 208. Spark plug 92 includes a first electrode 260 and a second electrode 262. Second electrode 262 may be in continuous electrical communication with ground 240. A spark may develop across gap 250 when an electrical potential difference exists between first electrode 260 and second electrode 262. In this way, ignition coils 206 and 208 supply electrical energy to spark plug 92. Spark plug 92 may initiate combustion in the engine cylinder when ignition coils 206 and 208 are discharged.

The system of FIGS. 1 and 2 provides for supplying spark to an engine, comprising: an engine including a cylinder; an ignition system including two ignition coils electrically coupled to a single spark plug, the single spark plug in the cylinder; and a controller including executable instructions stored in non-transitory memory to increase dwell time of the two ignition coils to a level where magnetic field strengths of each of the two ignition coil is within a predetermined field strength (e.g., within 90% of a saturated ignition coil field strength described in weber/meter$^2$) of coil saturation in response to a first episode of misfire in the cylinder. The system further comprises additional instructions to reduce exhaust gas recirculation supplied to the cylinder in response to a second episode of misfire in the cylinder, the second episode of misfire within a predetermined actual total number of cycles of the cylinder after the first episode of misfire. The system further comprises additional instructions to indicate ignition coil degradation for the cylinder and continue to combust air and fuel in the cylinder in response to absence of a third episode of misfire in the cylinder, the absence of the third episode of misfire within a predetermined actual total number of cycles of the cylinder after the second episode of misfire. The system further comprises additional instructions to indicate ignition coil degradation for the cylinder and cease combustion of air and fuel in the cylinder in response to a third episode of misfire in the cylinder, the third episode of misfire within a predetermined actual total number of cycles of the cylinder after the second episode of misfire. The system further comprises additional instructions to cease fuel delivery to the cylinder in response to the third episode of misfire. The system further comprises additional instructions to cease supplying energy to the two ignition coils in response to the third episode of misfire in the cylinder.

Referring now to FIG. 3, plots of ignition coil diagnostic sequences are shown. The signals are for the system of FIGS. 1 and 2. The sequence of FIG. 3 is based on the method of FIG. 4. The plots are time aligned and occur at a same time. The SS shown in the horizontal axis of each plot represents a break in time. The break in time may be long or short. Vertical markers T0-T11 represent times of particular interest during the sequence. All the plots are for a single cylinder of an engine.

The first plot from the top of FIG. 3 is a plot of indications of cylinder misfire for an engine cylinder versus cylinder cycle number for the cylinder. The vertical axis represents cylinder misfire indication for the cylinder. The horizontal axis represents cylinder cycle number for the cylinder. An indication of cylinder misfire (e.g., combustion of air and fuel not occurring or late partial combustion) is shown when the trace is at a higher level near the vertical axis arrow.

The second plot from the top of FIG. 3 is a plot of ignition coil dwell time (e.g., an amount of time the two ignition coils are charged) for ignition coils supplying electrical charge to a spark plug of the cylinder versus cylinder cycle of the cylinder. The vertical axis represents ignition dwell time for ignition coils supplying electrical charge to a spark plug of the cylinder and dwell time increases in the direction of the vertical axis. The horizontal axis represents cylinder cycle number for the cylinder. Horizontal line 302 represents an ignition coil dwell time above which magnetic field strength of the ignition coils saturates. In some examples, the two ignition coils may have different amounts of dwell time that the respective ignition coils saturate. In other words, the ignition coil is providing its full strength magnetic field when the dwell time is at 302 or greater.

The third plot from the top of FIG. 3 is a plot of EGR flow to the cylinder versus cylinder cycle number of the cylinder. The vertical axis represents EGR flow to the cylinder. The EGR flow increases in the direction of the vertical axis arrow. The horizontal axis represents cylinder cycle number of the cylinder.

The fourth plot from the top of FIG. 3 represents fuel injection state for the cylinder versus cylinder cycle number of the cylinder. The vertical axis represents fuel injection state and fuel is injected when the trace is at a higher level near the vertical axis arrow. Fuel is not injected to the cylinder when the trace is near the horizontal axis. The horizontal axis represents cylinder cycle number of the cylinder.

The fifth plot from the top of FIG. 3 represents ignition coil degradation state for the ignition coils supplying energy to the spark plug of the cylinder versus cylinder cycle number of the cylinder. The vertical axis ignition coil degradation state and one or both ignition coils are degraded when the trace is at a higher level near the vertical axis arrow. The ignition coils are not degraded when the trace is near the horizontal axis. The horizontal axis represents cylinder cycle number of the cylinder.

At time T0, ignition coil degradation is not indicated and cylinder misfire is not indicated. The ignition dwell time is a middle level and the EGR flow rate is at a higher level. Fuel injection is active and the cylinder is combusting air and fuel each engine cycle.

At time T1, a misfire episode in the cylinder is indicated. A cylinder misfire episode may be indicated in response to a decrease in engine acceleration, ion sensing, or a decrease in cylinder pressure. In one example, a misfire episode is where a threshold percentage of misfires occur in a cylinder during a predetermined actual total number of cycles of the cylinder. In another example, a cylinder misfire episode is one or more misfires in an engine cylinder with less than a predetermined number of non-misfires in the cylinder between cylinder misfires. For example, if the predetermined number of non-misfires is ten, a misfire episode may include a cylinder misfiring twenty times with ten or less misfires between the twenty misfires. The ignition dwell time is unchanged and EGR is flowing at a same rate as at time T0. Fuel is being injected to engine cylinders and the engine is combusting air and fuel. The ignition coils are not indicated as being degraded.

At time T2, the ignition dwell time is increased to an amount greater than 302 in response to the cylinder misfire episode indication. The EGR continues to flow at a same rate and fuel is injected to the cylinder. The ignition coils are not indicated as being degraded. The ignition coil dwell time is increased to supply more than enough energy to the ignition coils to ignite a substantially stoichiometric (e.g., a cylinder air-fuel ratio within ±0.75 air-fuel ratios of a stoichiometric air-fuel ratio for the cylinder) air-fuel mixture in the cylinder at the present EGR amount or rate if the ignition coils are operating as is desired or expected. If one or both ignition coils is degraded, there may be insufficient spark energy to ignite the air-fuel mixture in the cylinder. The ignition dwell time is increased to an amount of time that energizes the ignition coil's magnetic field to within a threshold field strength of full field strength or capacity. Alternatively, or in addition, the engine air-fuel ratio may be richened (e.g., by 1.5-2 air-fuel ratios) to improve ignitability and reduce the effect of EGR with regard to ignitability of the air-fuel mixture in the cylinder.

At time T3, a second cylinder misfire episode occurs. In this example, the second cylinder misfire episode occurs during a next cycle of the cylinder, but in other examples, the second cylinder misfire episode may be after a predetermined number of cycles of the cylinder. The ignition dwell time remains at its increased level and EGR is flowing to the cylinder at a same rate as at time T1. Fuel is injected to the cylinder and ignition coil degradation is not asserted.

At time T4, the EGR amount supplied to the cylinder is decreased. The EGR amount is decreased to determine if one of the ignition coils has capacity to ignite an air-fuel mixture in the cylinder when the cylinder has a lower EGR amount. By lowering the EGR amount, it may be determined if one of the two ignition coils is still operating without having to individually control the ignition coils. For example, if the EGR flow to the cylinder is reduced, thereby decreasing cylinder charge dilution and increasing air-fuel mixture ignitibility, and the cylinder misfires again, it may be determined that both ignition coils are degraded based on the misfire episode. However, if the cylinder fires, it indicates that lowering the EGR flow to the cylinder increases the ignitibility of the air-fuel mixture sufficiently such that a single non-degraded ignition coil has capacity to ignite the cylinder's air-fuel mixture. Thus, it may be determined that one ignition coil is not degraded. This contrasts with increasing dwell times of each coil to provide sufficient energy to ignite an air-fuel mixture in the cylinder in the presence of EGR, which provides insight to determine if both ignition coils are not degraded if the cylinder fires, but increasing dwell time of each ignition coil provides insufficient information to determine if one ignition coil is not degraded because one ignition coil could be operating as desired when misfire is indicated when the EGR flow rate is high because high EGR flow to the cylinder may prevent mixture ignition via a lower amount of energy provided by a single ignition coil. Consequently, it may be possible to determine whether or not one ignition coil is operable in fewer cylinder cycles since operation of each coil is not separately evaluated via individual coil commands in different cylinder cycles. The ignition dwell time remains at a level greater than 302. Fuel is injected to the cylinder and ignition coil degradation is not indicated.

At time T5, after a break in time amounting to N engine cycles, which allows for a decrease in EGR flow to the cylinder, another cylinder misfire episode is indicated. The ignition dwell time is still at a higher or longer amount of time. The EGR flow to the cylinder is off and fuel flow to the cylinder is not deactivated. Ignition coil degradation is not indicated.

At time T6, ignition coil degradation is indicated in response to the cylinder misfire indication after EGR flow to the cylinder is reduced. Fuel flow to the cylinder is ceased to deactivate the cylinder so that combustion in the cylinder ceases. Also, the ignition dwell time is adjusted to zero so that spark is not supplied to the cylinder. Thus, the cylinder is deactivated so that combustion in the cylinder ceases. Additional misfire episodes are not indicated in the cylinder. The air-fuel ratio of the remaining cylinders may be adjusted lean of stoichiometry after ignition coil degradation is indicated so that catalyst temperature does not increase while air is flowing through the deactivated cylinder.

In this way, ignition coil degradation may be determined. Further, if ignition coil degradation is present, the engine cylinder may be deactivated to mitigate conditions that may occur as a result of ignition coil degradation.

At time T7 and cylinder cycle number 1000, a second example sequence begins. Cylinder misfire is not indicated, ignition dwell time is low, and the EGR flow rate is at a middle level. Fuel injection to the cylinder is active and ignition coil degradation is not indicated.

At time T8, a cylinder misfire episode is indicated for the cylinder for a first time since the engine was stopped. The ignition coil dwell time is at a middle level and the EGR flow is at a middle level. Fuel injection to the cylinder is activated and the ignition coil is not indicated as being degraded.

At time T9, the ignition dwell time is increased to a level above 302 in response to the misfire at time T8. The EGR flow remains at a same level as at time T8 and fuel injection to the cylinder continues. The ignition coils are not indicated as being degraded. Thus, the ignition dwell is adjusted for a next combustion event in cylinder cycle 1002.

At time T10, a second cylinder misfire episode is indicated for the cylinder in cylinder cycle number 1002. The ignition dwell time is greater than 302 and EGR flow continues at a same level as at time T8. Fuel injection to the cylinder remains active and ignition coil degradation is not indicated.

At time T11, the EGR flow rate to the engine cylinder is decreased in response to the second cylinder misfire episode in the cylinder since engine stop. The ignition coil is not indicated to be degraded and fuel injection to the cylinder continues. The ignition dwell time remains at a level above 302.

At time T12, after a break in time amounting to K engine cycles, which allows for a decrease in EGR flow to the cylinder, ignition coil degradation is indicated in response to absence of misfire in the cylinder during cylinder cycle K. Thus, the cylinder combusts an air-fuel mixture in cycle number K as expected. Fuel flow to the cylinder remains activated and EGR flow to the cylinder is stopped in response to the indication of ignition coil degradation. The ignition coil dwell time remains at an elevated level. The cylinder continues to operate after time T12 combusting air and fuel so that the engine may provide substantial power if commanded. Indications of cylinder misfire episodes may be avoided by reducing the cylinder EGR rate.

In this way, degradation of an ignition coil may be determined while it is also determined that a second of the two ignition coils is not degraded. As such, the engine cylinder is operated with conditions so that the cylinder may continue to operate to provide a desired amount of engine torque.

Referring now to FIG. 4, a method for diagnosing an ignition system that supplies energy to a single sole spark plug in a cylinder via two ignition coils is shown. The engine and ignition system may be similar to the engine and ignition system shown in FIGS. 1 and 2. Additionally, at least portions of the method of FIG. 4 may be included as executable instructions in the system of FIGS. 1 and 2. Further, at least portions of the method of FIG. 4 may be actions taken within the physical world to transform ignition and engine operation. The method of FIG. 4 may be applied to ignition coils for all engine cylinders. The first ignition coil may be 206 of FIG. 2 and the second ignition coil may be 208 of FIG. 2.

At 402, method 400 judges if misfire episode is observed for the engine cylinder during a predetermined number of cycles of the cylinder. In one example, a misfire episode in the engine cylinder may be based on pressure in the cylinder being less than a threshold pressure. In another example, a misfire episode in the engine cylinder may be based on engine acceleration during the cylinder's power stroke being less than a threshold acceleration or based on ion sensor feedback. The engine acceleration may be determined from engine crankshaft position. If method 400 judges that a misfire episode is observed, the answer is yes and method 400 proceeds to 404. Otherwise, the answer is no and method 400 proceeds to 420.

At 420, method 400 operates the two ignition coils supplying electrical energy to the cylinder's spark plug with a dwell time that is stored in controller memory. The dwell time may be a predetermined dwell time empirically determined during development of the engine. Alternatively, the dwell time may be a time that is adapted based on engine and ignition coil operating conditions as described herein below. The dwell time is extracted from memory and current is supplied to the two ignition coils for the dwell time as the engine rotates and combusts air and fuel. Method 400 proceeds to exit.

At 404, method 400 increases dwell times of the two ignition coils to dwell times that saturate the two ignition coils (e.g., a dwell time above which the ignition coil magnetic field no longer strengthens or increases). The dwell time of an ignition coil is increased via increasing an amount of time current is supplied to the ignition coil at battery voltage without the current being limited from the battery via a switch or other device. The inductance of the first ignition coil may be different than the inductance of the second ignition coil. Therefore, the dwell times of the first ignition coil may be greater or less than the dwell time of the second ignition coil. Alternatively, the dwell time may be increased to be within a threshold dwell time of a dwell time where the ignition coil saturates (e.g., eighty percent of a dwell time where the ignition coils saturate). By increasing the dwell time, it may be possible to distinguish misfire in the cylinder due to ignition coil degradation and other misfire sources (e.g., misfire due to higher levels of cylinder charge dilution) or that the dual ignition coil system was designed to enable combustion at high cylinder charge dilution rates relative to an engine without external EGR or other methods of increased cylinder charge dilution. In particular, the dwell time may be increased to a time where the misfire should be eliminated unless ignition coil degradation is present. In other words, the dwell time may be increased to overcome excess charge dilution that may not be expected. The dwell time may be increased for the next cylinder cycle after the cylinder cycle in which misfire was detected so that presence or absence of misfire may be determined within two consecutive cylinder cycles. Alternatively, the dwell times of the ignition coils may be increased in response to a threshold percentage change in cylinder misfires for the cylinder over a predetermined actual total number of ignition events in the cylinder (e.g., a number of cylinder cycles in which the ignition coils are discharged). Method 400 proceeds to 406.

At 406, method 400 judges if a misfire episode occurs after ignition coil dwell times are increased in response to the misfire episode determined at 402. If method 400 judges that misfire episode occurs in the cylinder, the answer is yes and method 400 proceeds to 408. Otherwise, the answer is no and method 400 proceeds to 430.

At 430, method 400 reduces the dwell time of each of the two ignition coils supplying electrical energy to the cylinder's spark plug after the dwell time was increased at 404. The dwell time of each of the two ignition coils may be incrementally reduced over a plurality of cycles of the cylinder until misfire is observed in the cylinder. The dwell time that did not cause misfire episode in the cylinder just before the dwell time that resulted in misfire episode in the cylinder is stored to memory and method 400 proceeds to 432.

At 432, method 400 adds a predetermined amount of time to the dwell time determined at 430 so that a misfire episode due to low dwell time may be avoided. For example, if the dwell time at 430 is 2 milliseconds, 50 microseconds may be added to the 2 milliseconds to produce a dwell time value of 2.05 milliseconds. In this way, the possibility of misfire episode due to short dwell time may be reduced. The new dwell time including the predetermined amount of time is stored to memory for use when operating at the present engine speed and load. Method 400 proceeds to exit.

At 408, method 400 operates the two ignition coils supplying electrical energy to the cylinder's spark plug at the dwell time described at 404. The dwell times remain at the elevated level to help determine if ignition coil or ignition circuit degradation may be present. Method 400 proceeds to 410.

At 410, method 400 reduces EGR flow to the cylinder. If EGR is introduced in the engine intake manifold via an EGR valve, EGR flow to all engine cylinders may be reduced. In one example, an EGR valve supplying EGR to the engine intake manifold is closed to reduce EGR to the cylinder. Additionally, in some examples, valve timing for the cylinder may be adjusted to reduce intake and exhaust valve overlap so as to reduce internal EGR. Method 400 proceeds to 412.

In some examples, the air-fuel ratio in the cylinder may be richened to increase the possibility of igniting the air-fuel mixture in the cylinder before or at the same time the EGR supplied to the cylinder is reduced. Enriching the air-fuel mixture may provide a more improved environment for ignition.

At 412, method 400 judges if a misfire episode occurs in the cylinder after the cylinder's air fuel has been richened or after the EGR flow to the cylinder is reduced to less than a threshold after a misfire episode was determined in the cylinder cycle at 406, or if the percentage of misfires in the cylinder during a predetermined actual total number of cycles of the cylinder have decreased. Method 400 again may judge if a misfire episode occurs in a cylinder cycle in which the ignition coil dwell time has been increased after the misfire episode was detected in the cylinder at 402. If method 400 judges that a misfire episode occurs in the cylinder or if the percentage of misfires over a predetermined actual total number of cylinder cycles does not decrease, the answer is yes and method 400 proceeds to 440. Otherwise, the answer is no and method 400 proceeds to 414. If the answer is yes and the cylinder continues to misfire, it may be inferred that both ignition coils are degraded. Further, if EGR is reduced via a valve supplying EGR to the engine intake manifold, method 400 may judge if misfire is present after a predetermined number of cycles of the cylinder after EGR is reduced to allow the engine intake manifold to be purged of EGR before judging if cylinder misfire is present. In one example, the predetermined number of cylinder cycles is based on an actual total number of cylinder cycles to induct the intake manifold volume into engine cylinders. If intake and exhaust valve timing may be adjusted in a shorter time than a cylinder cycle to adjust EGR flow to the cylinder, method 400 may judge if cylinder misfire is present during a next cylinder cycle after misfire was previously determined.

At 440, method 400 provides an indication of ignition coil or ignition circuit degradation. The indication may be presented to the vehicle driver on a display or via a light. Method 400 proceeds to 442 after providing an indication of ignition coil or circuit degradation.

At 442, method 400 reduces or ceases to deliver EGR to the engine cylinder. EGR flow to other engine cylinders may also be reduced as compared to the amount of EGR supplied to the engine cylinders when ignition system degradation is not present. The EGR flow may be reduced via partially or closing an EGR valve that supplies EGR to engine cylinders. Method 400 proceeds to 444.

At 444, method 400 stops supplying electrical energy to the two ignition coils that supply high voltage to the cylinder's spark plug. The flow of current to the two ignition coils may be stopped via opening drivers in the ignition system. Method 400 proceeds to 446.

At 446, method 400 operates the remaining engine cylinders with a lean air fuel mixture. For example, if the engine is a four cylinder engine with cylinders 1-4 and ignition circuitry of cylinder number 2 is degraded, cylinders 1, 3, and 4 are operated with lean air-fuel mixtures while ignition circuit degradation is indicated. By operating the engine cylinders lean, less hydrocarbons may be made available in the engine's catalyst so that catalyst temperature does not exceed a threshold temperature. Method 400 proceeds to exit.

At 414, method 400 provides an indication of ignition coil or ignition circuit degradation. The indication may be presented to the vehicle driver on a display or via a light. Method 400 proceeds to 416 after providing an indication of ignition coil or circuit degradation.

At 416, method 400 reduces or ceases to deliver EGR to the engine cylinder. EGR flow to other engine cylinders may also be reduced as compared to the amount of EGR supplied to the engine cylinders when ignition system degradation is not present. The EGR flow may be reduced via partially or closing an EGR valve that supplies EGR to engine cylinders. Method 400 proceeds to 418.

At 418, method 400 continues supplying current to the two ignition coils for the threshold dwell time determined at 404. The absence of a misfire episode in the cylinder indicates that at least one coil or one portion of the ignition circuitry is performing as desired. The longer dwell time remains active so that the engine cylinder continues to fire. As such, the engine may deliver more power as compared to if the cylinder was deactivated by ceasing combustion in the cylinder. Nevertheless, ignition coil degradation is indicated.

Thus, method 400 may provide an indication of ignition coil degradation in as few as three consecutive cylinder misfires of the same cylinder. However, ignition coil degradation may be determined as a percentage of misfires in an actual total number of cycles of a cylinder. Further, ignition coil or circuitry induced misfires may be distinguished from EGR related cylinder misfires. In this way, cylinder misfires may be monitored and compensated for to improve engine operation.

The method of FIG. 4 provides for a method for operating an ignition system, comprising: receiving engine data to a controller; judging a presence or absence of a third misfire episode in a cylinder based on the engine data via the controller; and indicating ignition coil degradation and combusting air and fuel in the cylinder via the controller in response to absence of the third misfire episode in the cylinder during a predetermined number of cycles of the cylinder. The method further comprises increasing dwell times of two ignition coils supplying energy to a sole spark plug of the cylinder via the controller.

In some examples, the method includes where the dwell times are increased in response to a first misfire episode in the engine cylinder as determined via the controller before the judging the presence or absence of the third misfire episode in the engine cylinder during the predetermined actual total number of cycles of the cylinder. The method includes where the absence of the third misfire episode in the engine cylinder is after an indication of a second misfire episode in the engine cylinder within a predetermined number of combustion events in the cylinder before the predetermined actual total number of cycles of the cylinder. The method includes where the dwell times are increased to greater than a threshold in response to the first misfire in the engine cylinder. The method includes where the presence or absence of the third misfire episode is based on engine acceleration. The method includes where the presence or absence of the third misfire episode is based on pressure in the cylinder.

The method of FIG. 4 also provides for a method for operating an ignition system, comprising: receiving engine data to a controller; increasing a dwell time of two ignition coils supplying energy to a sole spark plug of a cylinder via the controller in response to a first misfire episode in the cylinder during a predetermined actual total number of cycles of the cylinder; decreasing EGR flow to the cylinder or richening an air-fuel mixture of the cylinder while the dwell time is increased via the controller in response to a second misfire episode in the cylinder, the second misfire episode within the predetermined actual total number of cycles of the cylinder after the first misfire episode; and indicating ignition coil degradation and combusting air and fuel in the cylinder via the controller in response to absence of a third misfire episode in the cylinder within the predetermined actual total number of cycles of the cylinder after the first misfire episode.

In some examples, the method further comprises indicating ignition coil degradation and ceasing combustion in the cylinder in response to a third misfire episode in the cylinder within the predetermined actual total number of cycles of the cylinder after the first misfire episode via the controller. The method includes where ceasing combustion in the cylinder includes ceasing to supply fuel to the cylinder. The method includes where ceasing combustion in the cylinder includes ceasing to supply energy to the two ignition coils. The method further comprises operating remaining engine cylinders with a lean air-fuel mixture in response to the third misfire via the controller. The method further comprises operating remaining engine cylinders with reduced EGR flow in response to the third misfire episode via the controller. The method includes where the dwell time is increased to a dwell time where ignition coil magnetic field strength saturates.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. The methods and sequences described herein may be provided via executable instructions stored in non-transitory memory of a control in the system or systems described herein. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, or alternative fuel configurations could use the present description to advantage.

The invention claimed is:

1. A method for operating an ignition system, comprising:
   receiving engine data to a controller;
   judging a presence or absence of a third misfire episode after an indication of a first and a second misfire episode in a cylinder based on the engine data via the controller; and
   indicating ignition coil degradation and combusting air and fuel in the cylinder via the controller in response to absence of the third misfire episode in the cylinder during a predetermined number of cycles of the cylinder, where the absence of the third misfire episode in the engine cylinder is after the indication of the second misfire episode in the engine cylinder within a predetermined number of combustion events in the cylinder before a predetermined actual total number of cycles of the cylinder.

2. The method of claim 1, further comprising increasing dwell times of two ignition coils supplying energy to a sole spark plug of the cylinder via the controller.

3. The method of claim 2, where the dwell times are increased in response to the first misfire episode in the engine cylinder as determined via the controller before the judging the presence or absence of the third misfire episode in the engine cylinder during the predetermined actual total number of cycles of the cylinder.

4. The method of claim 2, where the dwell times are increased to greater than a threshold in response to the first misfire episode in the cylinder.

5. The method of claim 1, where the presence or absence of the third misfire episode is based on engine acceleration.

6. The method of claim 1, where the presence or absence of the third misfire episode is based on pressure in the cylinder.

7. A method for operating an ignition system, comprising:
   receiving engine data to a controller;
   increasing a dwell time of two ignition coils supplying energy to a sole spark plug of a cylinder via the controller in response to a first misfire episode in the cylinder during a predetermined actual total number of cycles of the cylinder;
   decreasing EGR flow to the cylinder or richening an air-fuel mixture of the cylinder while the dwell time is increased via the controller in response to a second misfire episode in the cylinder, the second misfire episode within a predetermined actual total number of cycles of the cylinder after the first misfire episode;
   indicating ignition coil degradation and combusting air and fuel in the cylinder via the controller in response to absence of a third misfire episode in the cylinder within the predetermined actual total number of cycles of the cylinder after the first misfire episode, and indicating ignition coil degradation and ceasing combustion in the cylinder in response to the third misfire episode in the cylinder within the predetermined actual total number of cycles of the cylinder after the first misfire episode via the controller.

8. The method of claim 7, where ceasing combustion in the cylinder includes ceasing to supply fuel to the cylinder.

9. The method of claim 7, where ceasing combustion in the cylinder includes ceasing to supply energy to the two ignition coils.

10. The method of claim 7, further comprising operating remaining engine cylinders with a lean air-fuel mixture in response to the third misfire episode via the controller.

11. The method of claim 7, further comprising operating remaining engine cylinders with reduced EGR flow in response to the third misfire episode via the controller.

12. The method of claim 7, where the dwell time is increased to a dwell time where ignition coil magnetic field strength saturates.

13. A system for supplying spark to an engine, comprising:
   an engine including a cylinder;
   an ignition system including two ignition coils electrically coupled to a single spark plug, the single spark plug in the cylinder; and
   a controller including executable instructions stored in non-transitory memory to increase dwell time of the two ignition coils to a level where magnetic field strengths of the two ignition coils are within a threshold field strength of magnetic field strength saturation in response to a first misfire episode in the cylinder; to reduce exhaust gas recirculation supplied to the cylinder in response to a second misfire episode in the cylinder, the second misfire episode within a predetermined actual total number of cycles of the cylinder after the first misfire episode; and to indicate ignition coil degradation for the cylinder and continue to combust air and fuel in the cylinder in response to absence of a third misfire episode in the cylinder, the absence of the third misfire episode within a predetermined actual total number of cycles of the cylinder after the second misfire episode.

14. The system of claim 13, further comprising additional instructions to indicate ignition coil degradation for the cylinder and cease combustion of air and fuel in the cylinder in response to the third misfire episode in the cylinder, the third misfire episode within the predetermined actual total number of cycles of the cylinder after the second misfire episode.

15. The system of claim 14, further comprising additional instructions to cease fuel delivery to the cylinder in response to the third misfire episode.

16. The system of claim 14, further comprising additional instructions to cease supplying energy to the two ignition coils in response to the third misfire episode.

* * * * *